United States Patent [19]

Reich

[11] Patent Number: 4,555,956

[45] Date of Patent: Dec. 3, 1985

[54] TORQUEMETER APPARATUS

[75] Inventor: Richard B. Reich, Algonquin, Ill.

[73] Assignee: S. Himmelstein and Company, Hoffman Estates, Ill.

[21] Appl. No.: 645,540

[22] Filed: Aug. 29, 1984

Related U.S. Application Data

[63] Continuation of Ser. No. 491,548, May 4, 1983, abandoned.

[51] Int. Cl.⁴ ............................................. G01L 3/10
[52] U.S. Cl. .............................. 73/862.32; 73/862.35
[58] Field of Search .......... 73/862.19, 862.32, 862.33, 73/862.35, 862.08

[56] References Cited

U.S. PATENT DOCUMENTS

| Re. 26,501 | 12/1968 | Himmelstein et al. |
|---|---|---|
| Re. 28,899 | 7/1976 | Himmelstein et al. |
| 3,441,886 | 4/1969 | Tveter . |
| 3,531,748 | 9/1970 | Tveter et al. |
| 3,531,749 | 9/1970 | Tveter et al. |
| 3,613,457 | 10/1971 | Paine .............................. 73/862.08 |
| 3,717,029 | 2/1973 | Tveter . |
| 3,800,591 | 4/1974 | Tveter . |
| 3,827,506 | 8/1974 | Himmelstein et al. |
| 3,961,526 | 6/1976 | Himmelstein . |
| 4,142,591 | 3/1979 | Himmelstein . |
| 4,320,463 | 3/1982 | Himmelstein . |
| 4,381,684 | 5/1983 | Himmelstein . |
| 4,412,198 | 10/1983 | Reich . |

FOREIGN PATENT DOCUMENTS

| 2224215 | 11/1973 | Fed. Rep. of Germany ... 73/862.35 |
|---|---|---|
| 2549025 | 5/1977 | Fed. Rep. of Germany ... 73/862.35 |
| 0274425 | 6/1970 | U.S.S.R. ........................... 73/862.35 |
| 0369438 | 2/1973 | U.S.S.R. ........................... 73/862.35 |

Primary Examiner—Charles A. Ruehl
Attorney, Agent, or Firm—Wood, Dalton, Phillips, Mason & Rowe

[57] ABSTRACT

A torquemeter apparatus for use in measuring torque in a drive having a drive member and a driven member. The apparatus includes a signal transfer device and a torque sensing device connected to the signal transfer device. The driven member is journaled to the drive member by bearings. The torque sensing device is mounted to the drive member through a drive member extension outboard of the bearings. A flexible coupling is provided for transmitting driving force from the drive member outboard of the torque sensing device to the driven member, permitting substantially only torque forces acting coaxially on the drive member to be transferred from the driven member to the torque sensing device.

22 Claims, 3 Drawing Figures

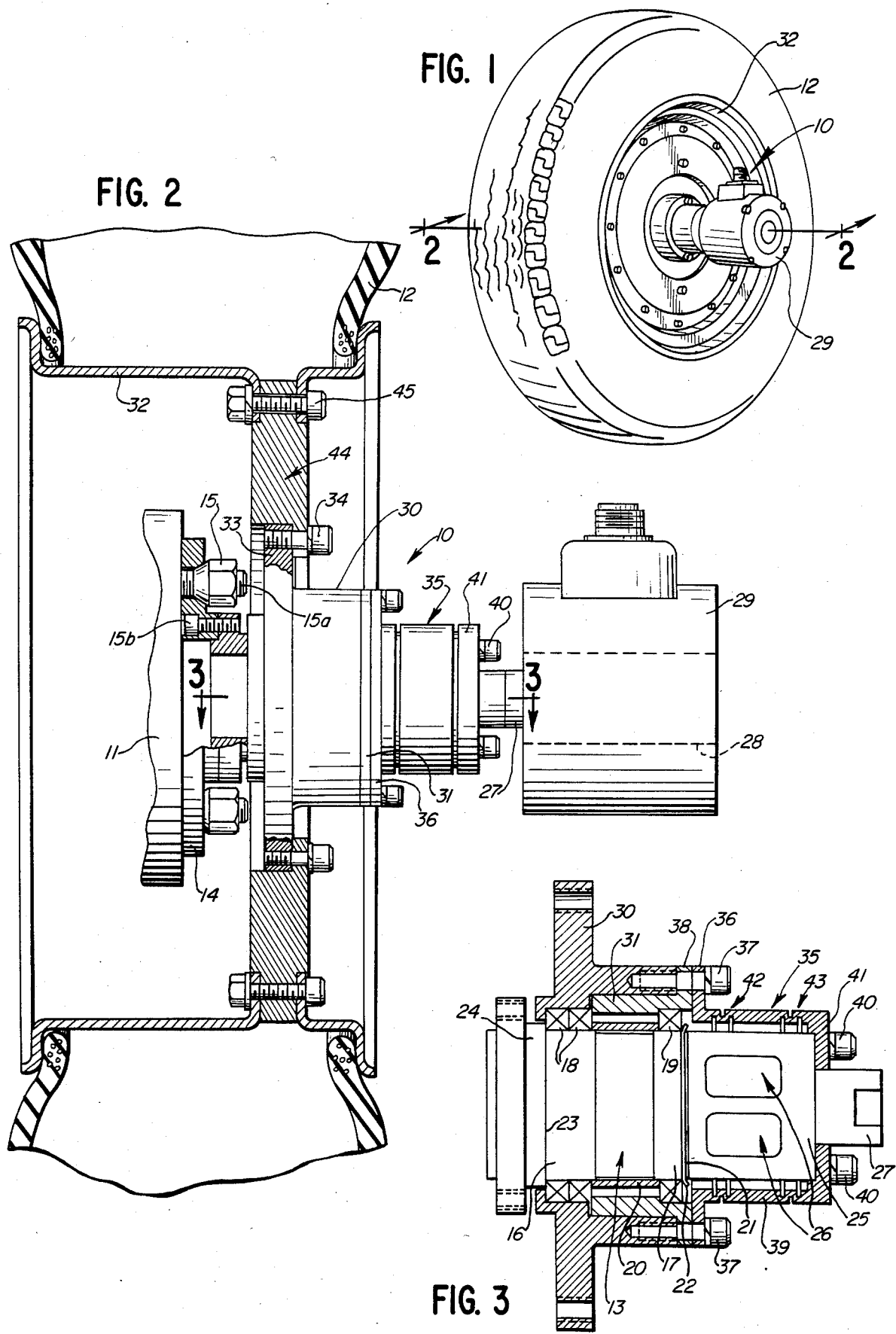

TORQUEMETER APPARATUS

This application is a continuation of application Ser. No. 491,548, filed May 4, 1983, now abandoned.

TECHNICAL FIELD

This invention relates to torquemeter apparatus and in particular to torquemeter apparatus for use in determining torque and other parameters of a drive system.

BACKGROUND ART

It is desirable to obtain information as to operating conditions of a drive system such as a vehicle drive system as by measuring the driving and drag torque at the drive wheels of the vehicle. Such information may be coordinated with a speed determination to obtain power and other desirable information relative to the operating efficiency and conditons of the vehicle drive system.

A problem has arisen in the conventional apparatuses for determining torque in such wheel drive systems in that extraneous forces, such as due to the loading of the vehicle on the wheel, cornering, etc., cause spurious signals to be produced in the torque measuring means so as to give false readouts, thereby adversely affecting the accuracy and usefulness of the torquemeter system.

DISCLOSURE OF INVENTION

The present invention is concerned with an improved torquemeter apparatus for use in measuring torque in a drive wherein the torque input provided to the torque sensing element are substantially free of spurious factors, such as due to loading, cornering forces, etc.

More specifically, the invention is concerned with such an improved torquemeter apparatus wherein improved means are provided for effectively isolating extraneous forces from the torque sensing means so that substantially only torque forces acting coaxially of the torquemeter shaft are transferred from the driven member to the torque sensing means.

More specifically, the invention comprehends the provision in a torquemeter apparatus for use in measuring torque in a drive having a driver and a driven member, a torquemeter and a torque sensor connected to the torquemeter, improved apparatus including means for rotatively journaling the driven member to the driver, means for mounting the torque sensor to the driver outboard of the journaling means, and flexible coupling means for transmitting driving force from the driver outboard of the torque sensor to the driven member, whereby extraneous forces acting on the driven member during measurement of the torque are isolated from the torque sensor and substantially only torque forces acting coaxially of the driver are transferred from the driven member to the torque sensor.

In the illustrated embodiment, the driver defines a drive shaft, and the improved torque sensing means includes a drive shaft extension, means for removably securing the drive shaft coaxially to one end of the drive shaft extension, bearing means for rotatably mounting the driven member to the shaft extension, means for mounting the torque sensor to the shaft extension outboard of the bearing means, and flexible coupling means for transmitting driving force from the shaft outboard of the torque sensor to the driven member.

In the illustrated embodiment, mounting means are provided for mounting the torquemeter coaxially to the drive shaft outboard of the strain gage.

In the illustrated embodiment, the flexible coupling means comprises a doubleflex coupling.

In the illustrated embodiment, the journaling means comprises axially spaced annular bearings.

The invention comprehends that the torque measuring means may be coaxially secured to one end of the drive shaft by a suitable adapter and removable securing means.

The torquemeter may be removably secured to the apparatus, and in the illustrated embodiment, is removably secured to the flexible coupling means outboard of the torque sensor.

In the illustrated embodiment, the flexible coupling means is removably secured to support means for carrying a wheel-driven member coaxially of the bearing means.

The improved torquemeter apparatus of the present invention is extremely simple and economical of construction, while yet providing the highly desirable features discussed above.

BRIEF DESCRIPTION OF THE DRAWING

Other features and advantages of the invention will be apparent from the following description taken in connection with the accompanying drawing wherein:

FIG. 1 is a perspective view of a torquemeter apparatus embodying the invention;

FIG. 2 is a fragmentary enlarged view partially in elevation and partially in section of the apparatus; and FIG. 3 is a fragmentary diametric section of the apparatus illustrating in greater detail the force transfer means and strain gage portion of the apparatus.

BEST MODE FOR CARRYING OUT THE INVENTION

In the illustrative embodiment of the invention as disclosed in the drawing, a torquemeter apparatus generally designated 10 is provided for measuring torque developed between a driver member and a driven member, and more specifically for measuring torque such as developed in a drive shaft 11 for driving a wheel 12, of an automotive vehicle or the like.

Apparatus 10 includes a drive shaft extension 13 which may be removably coupled to one end of the drive shaft 11 by means of an adapter 14, and suitable nuts 15 threaded onto the conventional mounting studs of the drive shaft wheel mounting means extended through the adapter. The adapter, in turn, is secured to the drive shaft extension by suitable bolts 15b.

Shaft extension 13 defines an inboard annular bearing pad 16 and an outboard annular bearing pad 17. Inboard bearings 18 are coaxially mounted about pad 16 and outboard bearing 19 is coaxially mounted about pad 17. An annular bearing spacer 20 is disposed between the bearings coaxially about the shaft extension.

The shaft extension is provided outboard of bearing pad 17 with an annular groove 21 receiving a removable locking ring 22 for retaining the bearings on the shaft extension, with the inboard bearing 18 urged against an annular shoulder 23 of an inboard collar portion 24 thereof.

Outboard of the groove 21, the shaft extension defines a distal torsion portion 25 carrying strain gage means 26 of conventional construction. An axial connector portion 27 extends coaxially outwardly from the torsion portion 25 for mounting the rotor 28 of a rotary transformer 29 coaxially to the shaft extension.

Wheel 12 is rotatably mounted to the shaft extension through the bearings 18 and 19 by means of a pair of annular bearing retainers 30 and 31. An annular wheel rim 32 carrying the wheel 12 is removably secured to a radial flange 33 of bearing retainer 30 by a connector ring 44, the wheel rim being secured to the connector ring by bolts 45 and the connector ring being secured to flange 33 by bolts 34.

An annular double flex coupling 35 is provided at its inboard end with a radial outturned flange 36. Bolts 37 are provided for removably securing coupling 36, an outboard outturned radial flange 38 of bearing retainer 31, and bearing retainer 30 in coaxial, fixed association.

Tubular midportion 39 of the flex coupling has an inner diameter slightly larger than the outer diameter of torsion portion 25 of shaft extension 13 and is coaxially mounted in spaced relationship thereto by a plurality of bolts 40 extending through an inturned distal radial flange 41 at the outboard end of the flex coupling midportion 39. As shown, the bolts 40 extend through the flange and into the distal end of the shaft extension for removably securing the flex coupling thereto as discussed above.

In the illustrated embodiment, the flex coupling midportion 39 is defined by a pair of inwardly and outwardly grooved sections 42 and 43 providing effective isolation of extraneous forces transmitted from the wheel 12 to the bearing retainers 30 and 31 so that substantially only coaxial torque forces are provided to the coupling portion 41 and, thus, to the strain gages 26 mounted on the shaft extension portion 25 to provide an improved, highly accurate torque signal for suitable delivery through the rotary transformer 29 electrically connected to the strain gages 26 in the conventional manner.

Bolts 40 may be undercut to provide a shear pin type of force transfer between the wheel and the flex coupling 35 to protect the expensive flex coupling and torque measuring apparatus.

As will be obvious to those skilled in the art, the isolation of extraneous loads performed by the bearings and flexible coupling, can also be used with any form of torque sensing means. For example, LVDT torque sensors, optical torque sensors, magnetostrictive torque sensors, phase type torque sensors, and the like may be used within the scope of the invention.

INDUSTRIAL APPLICABILITY

The torquemeter apparatus 10 provides an improved means for measuring torque in wheeled vehicles and the like wherein extraneous forces may be generated in the wheel mounting means which would otherwise provide spurious signals in the torque measuring apparatus. In the present invention, such spurious signals are prevented from being generated by preventing of the transmission thereof to the strain gages by means of a flexible coupling connected between the wheel bearing retainer means and the portion of the drive shaft to which the strain gages are mounted.

The use of a double flex coupling, such as coupling 35, effectively and positively insures the provision of only torsion loading at the gage portion of the apparatus.

This structure permits the use of any state-of-the-art design of the torsion section of the shaft extension including hollow, cruciform, and square cross section configurations.

Any suitable rotary transformer may be utilized as the rotor thereof may be readily connected to the shaft extension through the coupling means 27.

The apparatus permits the use of a wide range of commercially available wheel rims which may be readily mounted to the torquemeter apparatus by means of the mounting flange 33 and removable securing bolt means 34.

Configuration of the illustrated embodiment provides suitable clearance for use of the apparatus with disc brake-type wheel drives in the inherent provision of clearance for the typical disc brake calipers The design further provides clearance for protrusions on the centerline of the drive shaft, or axle, to which the device is mounted, by means of the adapter plate 14 and bolt securing means 15.

In the illustrated embodiment, the multiple grooved flex coupling 35 provides improved prevention of transmission of extraneous forces to the strain gages. As will be obvious to those skilled in the art, other forms of flex couplings may be utilized within the scope of the invention.

The improved torquemeter apparatus may be utilized in any industrial application wherein a true torque measurement of a rotary driven member is desired. Illustratively, the improved torquemeter apparatus may be utilized for measuring vehicle rolling resistance, instantaneous power, instantaneous torque, etc.

Further, improved torquemeter of the present invention is also advantageously adapted for use in pulley and sprocket drives where transmitted torque must be measured in the presence of large extraneous axial and bending loads such as produced by the belts and chains.

In summary, the torquemeter apparatus 10 is used in measuring torque developed by a driver means 11, such as a drive shaft, for driving a driven means 12, such as a wheel. The apparatus includes a flexible isolation member 35 illustratively comprising the annular double flex coupling, which is coupled to the driver means to have torque forces developed therein in accordance with the output torque of the driver means 11. A torquemeter means 26 illustratively comprises herein strain gage means which is responsive to torque transmitted through the isolation member for providing an output torque signal corresponding thereto. A mechanical support means 18,19 is provided in parallel with the isolation member 35 for causing forces, other than torque forces, from being transmitted through the isolation means. Thus, as discussed above, the isolation member 35 effectively prevents transmission of extraneous forces from being transmitted to the strain gages 25 and 26, and may comprise any suitable form of flexible coupling.

The mechanical support means 18,19 carries nontorsion loads produced by the driver means 11, and the flexible isolation member 35 completes a torque transmitting path from the driver means 11 to the torquemeter means 25,26 so that the torquemeter is responsive to the torque output of the driver means 11 free of extraneous forces developed in the operation of the drive system, thereby providing an improved, highly accurate torque signal substantially unaffected by such extraneous forces which commonly occur in the operation of such drive systems.

The foregoing disclosure of specific embodiments is illustrative of the broad inventive concepts comprehended by the invention.

I claim:

1. In a torquemeter apparatus for use in measuring torque in a rotating drive having a driver member and a driven member, said apparatus having signal transfer means and a torque sensing means connected to the signal transfer means, the improvement comprising:
    means for rotatably journaling said driven member to said driver member;
    means for mounting the torque sensing means to said driver member outboard of said journaling means; and
    flexible coupling means for transmitting driving force from said driver member outboard of said torque sensing means to said driven member, whereby extraneous forces acting on said driven member during measurement of said torque are isolated from said torque sensing means and substantially only torque forces acting coaxially of said driver member are transferred from said driven member to said torque sensing means.

2. The torquemeter apparatus of claim 1 wherein said flexible coupling means comprises a doubleflex coupling.

3. The torquemeter apparatus of claim 1 wherein said flexible coupling means comprises a doubleflex coupling having series-related flexible coupling means.

4. The torquemeter apparatus of claim 1 wherein the journaling means comprises axially spaced annular bearings.

5. The torquemeter apparatus of claim 1 wherein the journaling means comprises axially spaced annular bearings mounted coaxially of said driver member.

6. The torquemeter apparatus of claim 1 wherein said means for journaling the driven member to the driver member comprises an adapter defining a driver extension, means for coaxially securing the driver extension to an end of the driver member, hub means, and means for rotatably mounting the hub means to said driver extension.

7. The torquemeter apparatus of claim 1 wherein said means for journaling the driven member to the driver member comprises an adapter defining a drive extension, means for coaxially securing the drive extension to an end of the driver member, hub means, and means for rotatably mounting the hub means to said drive extension, and said torque sensing means is mounted to said drive extension outboard of said means for rotatably mounting the hub to said drive extension.

8. In a torquemeter apparatus for use in measuring torque in a wheeled drive having a drive shaft and a drive wheel, said apparatus having a rotary transformer and a strain gage connected to the transformer, the improvement comprising:
    means for rotatably journaling said drive wheel to said drive shaft;
    means for mounting the strain gage to said shaft outboard of said journaling means;
    flexible coupling means for transmitting driving force from said shaft outboard of said strain gage to said drive wheel, whereby extraneous forces acting on said wheel during measurement of said torque are isolated from said strain gage and substantially only torque forces acting coaxially of said shaft are transferred from said wheel to said strain gage; and
    mounting means for mounting the rotor of said rotary transformer coaxially to said drive shaft outward of said strain gage.

9. The torquemeter apparatus of claim 8 wherein said mounting means comprises means for removably connecting the rotary transformer coaxially to said drive shaft.

10. The torquemeter apparatus of claim 8 wherein said means for rotatably journaling said wheel comprises a coaxial extension of said wheeled drive shaft, and said mounting means comprises means for securing the transformer rotor to said coaxial extension.

11. The torquemeter apparatus of claim 8 wherein said mounting means comprises means for mounting the rotor of said rotor transformer to said flexible coupling means.

12. In a torquemeter apparatus for use in measuring torque in a wheeled drive having a drive shaft and a drive wheel, said apparatus having a rotary transformer and a stain gage connected to the transformer, the improvement comprising:
    a drive shaft extension;
    means for removably securing the drive shaft extension coaxially to one end of the drive shaft;
    bearing means for rotatably mounting the wheel to the shaft extension;
    means for mounting the strain gage to said drive shaft extension outboard of said bearing means; and
    flexible coupling means for transmitting driving force from said shaft outboard of said stain gage to said drive wheel, whereby extraneous forces acting on said wheel during measurement of said torque are isolated from said strain gage and substantially only torque forces acting coaxially of said shaft are transferred from said wheel to said strain gage.

13. The torquemeter apparatus of claim 12 wherein said bearing means comprises axially spaced annular bearings and annular bearing retainer means extending coaxially about said bearings, and means for mounting the wheel to said bearing retainer means.

14. The torquemeter apparatus of claim 12 wherein said bearing means comprises axially spaced annular bearings and annular bearing retainer means extending coaxially about said bearings, and means for mounting the wheel to said bearing retainer means, and further including means for removably mounting said flexible coupling means to said bearing retainer means and to said shaft extension outboard of strain gage means.

15. The torquemeter apparatus of claim 12 wherein said bearing means comprises axially spaced annular bearings and annular bearing retainer means extending coaxially about said bearings, and means for mounting the wheel to said bearing retainer means, and further including means for mounting the rotor of said rotary transformer coaxially to said drive shaft extension.

16. In a torquemeter apparatus for use is measuring torque in a wheeled drive having a drive shaft and a drive wheel, said apparatus having a rotary transformer and a strain gage connected to the transformer the improvement comprising:
    means for rotatably journaling said drive wheel to said drive shaft;
    means for mounting the strain gage to said shaft outboard of said journaling means; and
    flexible coupling means for transmitting driving force from said shaft outboard of said strain gage to said drive wheel, whereby extraneous forces acting on said wheel during measurement of said torque are isolated from said strain gage and substantially only torque forces acting coaxially of said shaft are transferred from said wheel to said strain gage:

17. The torquemeter apparatus of claim 16 wherein said flexible coupling means comprises a multiflex coupling.

18. The torquemeter apparatus of claim 16 wherein said flexible coupling means comprises a multiflex coupling having series-related flexible coupling means.

19. The torquemeter apparatus of claim 16 wherein the journaling means comprises axially spaced annular bearings.

20. The torquemeter apparatus of claim 16 wherein the journaling means comprises axially spaced annular bearings mounted coaxially of said drive shaft.

21. The torquemeter apparatus of claim 16 wherein said means for journaling the wheel to the drive shaft comprises an adapter defining a shaft extension, means for coaxially securing the shaft extension to an end of the drive shaft, wheel hub means, and means for rotatably mounting the wheel hub means to said shaft extension.

22. The torquemeter apparatus of claim 16 wherein said means for journaling the wheel to the drive shaft comprises an adapter defining a shaft extension, means for coaxially securing the shaft extension to an end of the drive shaft, wheel hub means, and means for rotatably mounting the wheel hub means to said shaft extension, and said strain gage is mounted to said shaft extension outboard of said means for rotatably mounting the wheel hub to said shaft extension.

* * * * *